United States Patent [19]

Allen et al.

[11] Patent Number: 4,910,754

[45] Date of Patent: Mar. 20, 1990

[54] INITIALIZATION AND SYNCHRONIZATION METHOD FOR A TWO-WAY COMMUNICATION LINK

[75] Inventors: John D. Allen, Bolton; Jeffrey V. Hill, Marlborough, both of Mass.

[73] Assignee: Data General Corporation, Westboro, Mass.

[21] Appl. No.: 252,460

[22] Filed: Sep. 30, 1988

[51] Int. Cl.⁴ ............................................ H04L 7/10
[52] U.S. Cl. .................................. 375/108; 371/47.1; 375/116; 375/121
[58] Field of Search ............... 178/3; 375/36, 37, 106, 375/111, 116, 121, 7, 8, 9, 108; 371/47, 48, 49, 51, 47.1, 49.1, 49.2, 51.1

[56] References Cited

U.S. PATENT DOCUMENTS

| | | | |
|---|---|---|---|
| 3,245,040 | 4/1966 | Burdett et al. | 371/51 |
| 3,457,550 | 7/1969 | Gibson et al. | 375/121 |
| 4,641,310 | 2/1987 | Martens et al. | 371/51 |
| 4,695,946 | 9/1987 | Andreasen et al. | 364/200 |
| 4,727,370 | 2/1988 | Shih | 375/121 |
| 4,782,498 | 11/1988 | Copeland, III | 375/121 |

*Primary Examiner*—Benedict V. Safourek
*Attorney, Agent, or Firm*—Sewall P. Bronstein; Robert M. Asher

[57] ABSTRACT

An initialization or synchronization method in which at least a predetermined number of synchronization messages are sent out over a two-way communication line. The receipt of a synchronization message is awaited before terminating the transmission of synchronization message. After the transmission of synchronization messages has been terminated the receipt of a non-synchronization message will complete the synchronization process. However, certain conditions may cause synchronization to be restarted such as a predetermined number of consecutive error messages, failure to receive any message in a predetermined number of clock signals, receiving more than a predetermined number of synchronization signals, or a reset command.

12 Claims, 3 Drawing Sheets

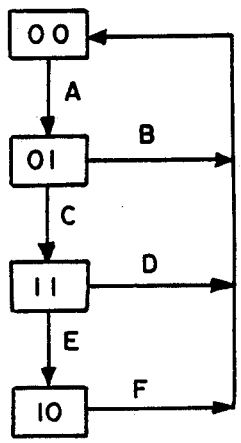

00 = RESET
01 = WAITING TO SEND 8 SYNC. MESSAGES & CORRECT / 4 SEC./SYNC.MESSAGE
11 = WAITING FOR A NON-SYNC. SIGNAL
10 = NORMAL

A = AUTOMATIC
B = RESET
C = AT LEAST 8 SYNC. MESSAGES SENT & AT LEAST 1 SYNC.
    MESSAGE CORRECTLY RECEIVED.
D = 3 SEQUENTIAL MESSAGES WITH ERRORS HAVE BEEN RECEIVED OR
    32 SYNC. MESSAGES HAVE BEEN RECEIVED OR
    8 MESSAGES OF ANY TYPE HAVE BEEN SENT BUT NO MESSAGES
    OF ANY TYPE HAVE BEEN RECEIVED OR RESET

E = A NON-SYNC. MESSAGE HAS BEEN RECEIVED

F = A SYNC. MESSAGE HAS BEEN RECEIVED OR
    3 SEQUENTIAL MESSAGE WITH ERRORS HAVE BEEN
    RECEIVED OR 8 MESSAGES (EITHER SYNCHRONIZATION OR
    NON-SYNCHRONIZATION) HAVE BEEN SENT BUT NO
    SYNCHRONIZATION OR NON-SYNCHRONIZATION MESSAGES HAVE
    BEEN RECEIVED OR RESET

FIG. 3

INITIALIZATION AND SYNCHRONIZATION METHOD FOR A TWO-WAY COMMUNICATION LINK

BACKGROUND OF THE INVENTION

The present invention is directed to a method for initializing or synchronizing a communication link, in particular, an initialization and synchronization algorithm for use in a full duplex line connecting two computer chassis.

Known methods for synchronization include start-stop systems ("space-mark") including standard ASCII/EBCDIC serial character transmission with a "start" bit and other one way systems with no error correction or acknowledgement of reception. Another variation is the use of a start character in serial or parallel transmission following an idle state. The start character is detected by a circuit which is always active and must be a unique code which never occurs in the data stream. These known methods generally require synchronization before every message. Since they resynchronize on every message, these systems do not have or need a detection of loss of synchronization. In many cases, the synchronization on every message consumes bandwidth which is valuable in systems which operate at a very high speed.

It is an object of the present invention to provide initial synchronization and re-synchronization between two independent systems without the loss of data and provides it automatically—without the intervention of a person or a software program. No sequencing of power or resetting of the two independent systems is required to achieve operation after the disruption of the link by operator intervention, hardware, or power failure.

SUMMARY OF THE INVENTION

The present invention is directed to a method for initializing or synchronizing communications between two interfaces. At least a predetermined number of synchronization signals are transmitted. Incoming signals are reviewed to identify when a synchronizing signal has arrived. After a synchronizing signal has been received and the predetermined number of synchronization signals have been transmitted, the transmission of synchronization signals is terminated. A timing signal is generated at equal intervals following the receipt of an incoming synchronization signal. The timing signal is used to indicate the first word in each incoming message.

This method is performed at both interfaces. It is triggered upon powering up a system, the occurence of three consecutive erroneous messages, or the failure to receive any messages in a predetermined amount of time. Thus, the use of this method in conjunction with an error detection scheme, such as CRC (cyclic redundancy check), provides automatic recovery from burst errors or a missing clock cycle.

Other objects and advantages of the invention will become apparent during the following description of the presently preferred embodiment of the invention, taken in conjunction with the drawings.

BRIEF DESCRIPTION OF THE DRAWINGS

FIG. 3 is a logic state diagram for the current state control machine of the transmitter of FIG. 2.

DETAILED DESCRIPTION OF THE PREFERRED EMBODIMENT

Figure 1:
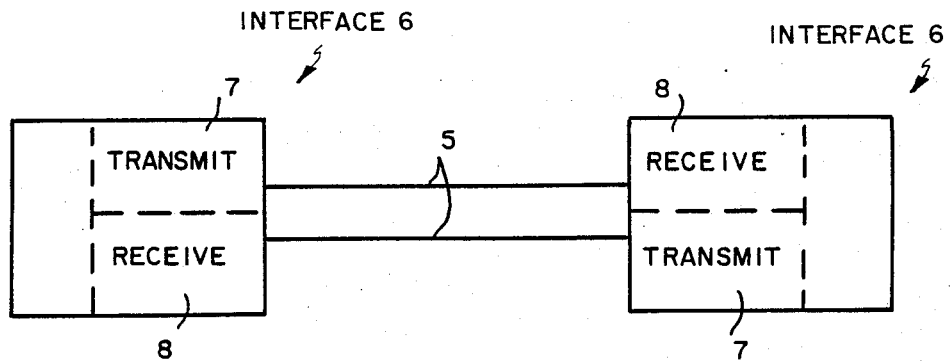
FIG. 1 is a schematic block diagram of two interfaces connected by a duplex bus.

Referring now to the drawings, a full duplex inter-chassis bus 5 is shown in FIG. 1. The bus has two separate signal lines or other sets of signal lines, the first for communications travelling in one direction and the second for communications travelling in the opposite direction. A computer chassis gets connected to the bus 5 by an interface 6. Each interface 6 includes a transmitter 7 and a receiver 8. The transmitter on one interface communicates with the receiver on the other interface. Since the two computer chassis connected by the bus are independent, it is necessary for a synchronization method to be employed so that information sent over the bus can be understood at the computer on the other end. This is particularly necessary in the preferred embodiment where messages are sent in packets of four serially transmitted parallel words. Synchronization is required to identify which word being received is the first of four.

Figure 2:
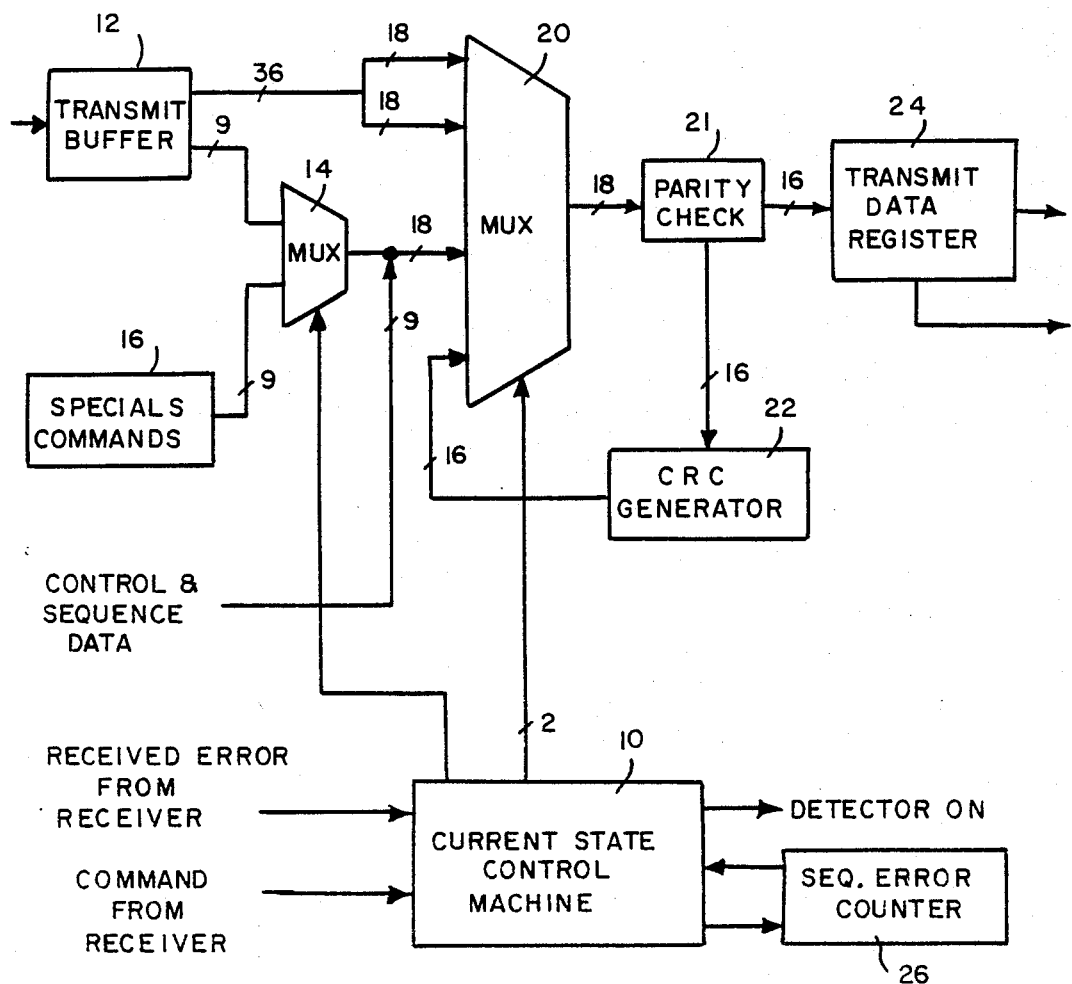
FIG. 2 is a schematic block diagram of a transmitter for use in the interfaces of FIG. 1.

A transmitter is shown in FIG. 2 which ma be constructed in a conventional manner but for the addition of means for performing the initialization and synchronization method of the present invention. FIG. 2 is a simplified schematic of the transmitter of the present invention. A current state control machine 10 is added to the transmitter to implement the initialization and synchronization algorithm of the present invention. Data which will eventually be sent out from the transmitter is initially stored in a transmit buffer area 12. In the presently preferred embodiment, 9 bits, comprised of 8 bits of data and a parity bit, is fed from the transmit buffer 12 into a multiplexor 14. The multiplexor 14 also receives 9 bits of input from a set of special commands 16. Included among the special command set 16 would be a synchronization code. The code provides 8 bits representing the synchronization signal and a parity bit. The multiplexor 14 selects 9 bits either from the transmit buffer 12 or the special command set 16 in response to control signals from the current state control machine 10. Added to the 9 bit output from the multiplexor 14 is an additional 8 bits of control and sequence data along with the corresponding parity bit.

A 4×1 multiplexor 20 receives two 16 bit words of data along with parity bits from the transmit buffer 12, 9 bits from the multiplexor 14, 9 bits for the control and sequence data and 16 bits of error detection data. The error detection data is provided by a CRC generator 22 in the presently preferred embodiment. Of course, any conventional detection method deemed suitable by one skilled in the art may be used to generate the error detection data. The multiplexor 20 is controlled by the current state control machine 10. Bits are clocked out from multiplexor 20 in parallel groups of 18. This includes 16 data bits and 2 parity bits. These are all fed into the party check 21. Once the parity has been checked, the parity bits are no longer needed and the 16 data bits are passed into the CRC generator 22 and a transmit data register 24. The transmit data register 24 is a temporary storage for the data until it is sent out by the transmitter.

In accordance with the presently preferred embodiment, messages are transmitted as four 16 bit words. Each 16 bit word is sent out one after another. A message is complete after all four 16 bit words have been transmitted. Synchronization is required so that a receiver knows which 16 bit word is the first in a four word message. Otherwise, the messages could not be understood. The presently preferred embodiment is designed for use on a full duplex cable in which there is a first line for transmitting and a second line for receiving data.

The current state control machine 10 is connected to a sequential error counter 26. A received error signal from the receiver is conducted over a line into the current state control machine, thus the machine can keep track of the number of messages which are received that contain errors. The sequential error counter 26 keeps a count of each message containing an error as they occur sequentially. A total of three or more sequential errors in accordance with the presently preferred embodiment would cause the current state control machine to enter into its synchronization routine, since in such an instance there is a communication problem which may have been caused by a loss of synchronization.

The current state control machine 10 is also provided with a command signal from the receiver which would indicate if a synchronization signal has been received If the interface at the other end of the communication cable has sent a synchronization signal, it is necessary for the transmitter at the end which receives that synchronization signal to enter into its synchronization algorithm to resynchronize communications over the communication link. The current state control machine also provides a DETECTOR ON signal which is sent to the receiver portion of the cable interface. The use of this signal is discussed below in conjunction with the receiver and the algorithm performed by the current state control machine.

The algorithm employed by the current state control machine 10 for initializing the communications over the interchassis bus is shown in FIG. 3. When one interface on the bus powers up, it will employ the algorithm to effect initialization of bus communications. It is contemplated that in communicating over the interchassis bus that communications will continue in both directions at all times. If there is no data that needs to be sent, an idle message will be sent just to maintain the synchronization in effect throughout the communications. Should synchronization be lost at any time, the algorithm of the present invention will be implemented to resynchronize communications over the line.

The base state 00 is where the state machine begins upon powering up or after a reset signal. The state machine automatically changes to the state 01 at the next clock signal. Also, the current state control machine sends the DETECTOR 0N signal to the receiver portion of the interface so that the receiver will begin to look for a synchronization message and otherwise stop processing incoming data. In the state 01, the current state control machine 10 causes synchronization signals to be sent out on the interchassis bus 5. Each synchronization signal is a 16 bit word. The synchronization signal is followed by three other 16 bit words. The first two words of these three words are irreleVant, but the final word is the error checking word. The error checking word enables the other side of the communication line to make sure that it has correctly received a message. The presently preferred synchronization signal is specifically FF72. If the next two data words sent along with the synchronization signal are all 0's, the CRC-16 error checking word is C61E. These four data words comprise a synchronization message.

The state control machine will cause at least eight synchronization messages to be transmitted out over the communication line. The minimum number 8 was chosen because it gives the receiver enough time to recover from a synchronization signal received in a message with errors. It was also selected because it is a factor of two making it more convenient. Other minimum numbers may be selected which would work just as well for other particular systems.

In state 01, the current state control machine waits for at least eight synchronization messages to be sent out, but will also be waiting to receive correctly at least one synchronization message from the interface at the other side of the communication link. Once both these conditions have been met, the control state machine changes state from 01 to 11. Until the synchronization message is received, the transmitter continues sending out synchronization messages. When the state changes to 11, the transmission of synchronization messages is terminated. Should a reset signal arrive prior to the sensing of the two conditions, the control state machine returns to state 00. While the control state machine waits for a correctly received synchronization message, if a synchronization signal is received in a message having a CRC error, then the control state machine reasserts the DETECTOR ON signal so that the receiver continues searching for a synchronization signal.

In state 11, the current state control machine awaits to learn of receipt of a non-synchronization message at the receiving portion of the interface. Once the first non-synchronization message is received, the current state control machine moves into the normal state identified as 10. There are a number of conditions however which will prevent the control machine from going from state 11 to state 10. These conditions will cause the state machine to return to the RESET mode in state 00. One such reset causing condition is the occurence of three sequential messages containing errors. The sequential error counter 26 keeps a record of how many messages are received sequentially, each containing errors. If the number reaches three, it may be indicative of an error in the synchronization process and a reset is caused to start the process all over. Another problem is indicated if the interface receives 32 synchronization messages before receiving a non-synchronization message. In such a situation, apparently the interface on the other side of the communication line has not been able to detect the synchronization message being sent from this side of the line. Therefore, the state machine causes the synchronization process to start all over again. A third reset causing condition is if while in state 11, the transmitter sends out eight messages but does not receive any messages of any kind from the other end of the communication link.

In the normal mode, 10, the synchronization process will be started whenever an interface receives a synchronization message from the other side of the communication line. Also, synchronization may be started whenever three messages are received sequentially, each containing errors. Thirdly, if the receiving line goes dead and eight messages are sent out by the transmitter without any messages of any kind being received over the receiver interface, then synchronization will be reinitiated. Finally, a reset signal at any time would cause the initialization/synchronization algorithm to restart.

Figure 4:
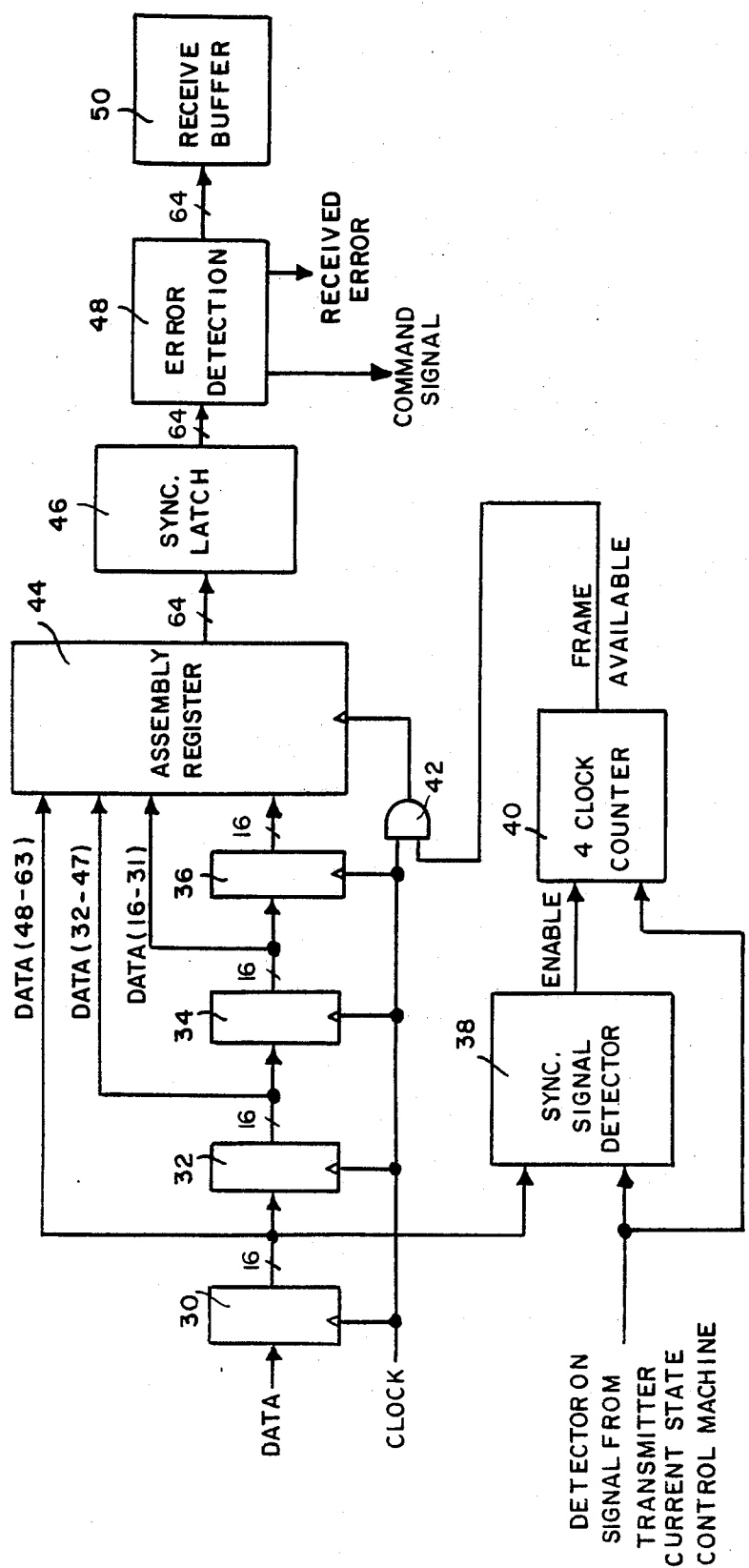
FIG. 4 is a schematic block diagram of a receiver for use in the interfaces of FIG. 1.

In this manner, the intercommunications over the communication link between the two interfaces can be maintained in operation automatically. If there is a power surge or if one of the boards is removed, the interfaces on the communication line enter into the synchronization process until synchronization is successfully restored. Besides this automatic handling of synchronization, a reset signal may be provided to the transmitter interface to purposefully cause synchronization to be entered into. Referring now to FIG. 4, the receive portion of the communication line interface is shown. Data coming into the interface from off of the communication line is provided to a series of registers 30, 32, 34, 36. At each clock cycle, each register passes its contents to the next register in line. The first register 30 takes its data in the form of a 16 bit word directly or indirectly from the communication line. It is the objective of the synchronization process to determine for the interface which of the 16 bit words coming into the receiver is the first of a four word message.

Whenever an initialization or synchronization process begins, the control state machine in the transmitter portion of the interface sends a DETECTOR ON signal to a sync signal detector 38 in the receiver portion of the interface. The sync signal detector 38 is only activated in response to this DETECTOR ON signal. When it is activated it receives the data stored in the first register 30. That data is directly compared with the known sync signal which in the presently preferred embodiment is FF72. Using conventional circuitry comprised of a number of logic gates if all 16 bits match the 16 bit sync signal then an enable signal is sent out by the sync signal detector 38 to indicate that a synchronization signal has been received. The enable signal is provided to a four clock counter 40.

The four clock counter 40 generates a FRAME AVAILABLE signal when the synchronization signal is in the fourth and final register 36. Thereafter, every four clock signals the counter will generate a FRAME AVAILABLE signal to provide timing in synchronization with the receipt of messages. The sync signal detector 38 will not be used thereafter until another DETECTOR ON signal is received.

In accordance with an alternate embodiment, the clock counter 40 can be made variable so that the system may be used for messages having a number other then 4 parallel words. To operate under this alternate scheme a message length code would need to be sent with or immediately following a synchronization signal. The length code could be provided to the counter to set it for the desired number of parallel words per message. Then, the clock counter 40 would generate the FRAME AVAILABLE signal after every desired number clock signals as set by the length code. In this manner, the present scheme may be used in a system which can vary the number of parallel words per message.

The FRAME AVAILABLE signal is fed along with a clock signal into an AND gate 42 so that upon a coincidence of the clock signal and the frame available signal, an assembly register 44 is loaded with the contents of all four of the series of registers 30, 32, 34, 36. Assembly register 44 holds all 64 of the bits contained by these registers. Thus, an entire message is held by the assembly register 44.

From the assembly register forward, the design of the receiver is completed in any suitable conventional manner. The message in assembly register 44 of FIG. 4 is passed into a sync latch 46. The receiver then provides error detection circuitry 48. In accordance with the presently preferred embodiment, the fourth word in a message is a CRC error detection word. The error detection circuitry 48 compares the error detection word with the word that should be generated to agree with the other three words in the message. If there is one-to-one correspondence between the expected word and the CRC word which is received, then no error has been detected and the message is passed into a receiver buffer 50. If an error is detected, an error received signal is generated by the error detection circuitry. The error received signal is sent to the transmit portion of the interface where it is used by the current state control machine as discussed above.

Further, in accordance with the present invention, a command signal is forwarded from the error detection circuitry 48 to the transmit portion of the interface. The command signal indicates what type of message has been received. This signal is used by the current state control machine to determine when a synchronization message or a non-synchronization message has been received. When the message received by the receiver is a synchronization message, the current state control machine will take action as described with respect to the flow diagram of FIG. 3 depending upon what state it is in. In combination with the command signal, the error received signal informs the current control state machine when a synchronization message has been correctly received. After completing the error detection circuitry, the message is passed into a receive buffer 50 where it is handled in conventional ways.

Using the algorithm of the present invention, the interfaces on either side of the communication link can recover from burst errors regardless of which side starts into its synchronization algorithm first. The algorithm provides for easy and automatic resynchronization while communications are in progress. The algorithm advantageously provides for recovery from a missing or extra clock pulse. Thus, according to the method of the present invention, initialization can be achieved between two interfaces connected by a two-way communication link and that synchronization, once achieved, is effectively maintained.

A further advantage of the present algorithm is that it can be used in parallel data transmission systems, such as the preferred embodiment, or in serial transmission systems.

Of course, it should be understood that various changes and modifications to the preferred embodiment described above will be apparent to those skilled in the art. For example, the particular numbers of signals such as the eight synchronization messages, the 32 synchronization messages and the four words per message can be changed to accommodate a particular system's needs and are not critical to the present invention. Furthermore, the use of the method is not limited to duplex cables, it may be used over radio, microwave, fiber optic or other conventional communication links as well. These and other changes can be made without departing from the spirit and scope of the invention and without diminishing its attendant advantages. It is therefore intended that such changes and modifications be covered by the following claims.

We claim:

1. A method for initializing a communication link between a first and a second interface comprising the steps of:
    comparing, at said first interface, incoming signals from said second interface with a synchronization signal;
    transmitting at least a first predetermined number of synchronization signals from said first interface;
    detecting an incoming synchronization signal when an incoming signal is identical to said synchronization signal;
    terminating the transmission of synchronization signals from said first interface after both an incoming synchronization signal has been detected and said first predetermined number of synchronization signals has been transmitted; and
    generating an available signal at regular intervals following the detection of an incoming synchronization signal.

2. The initialization method of claim 1 further comprising the step of checking for errors in incoming signals and wherein said step of detecting requires that an incoming synchronization signal be received without errors.

3. The initialization method of claim 2 further comprising the step of repeating the initialization method if three consecutive signals are received each containing an error.

4. The initialization method of claim 1 further comprising the step of counting synchronization signals as they are received and repeating said initialization method if the number of synchronization signals received exceeds a second predetermined number, said second predetermined number being larger than said first predetermined number.

5. The initialization method of claim 1 further comprising the step of continually transmitting signals over said communication link at regular intervals after terminating the transmission of said synchronization signals.

6. The initialization method of claim 4 further comprising the step of repeating said initialization method if no incoming signals are received after a third predetermined number of signals are transmitted following the termination of the transmission of said synchronization signals.

7. A method for synchronizing a first and second interface on a communication link comprising the steps of:
    (a) receiving an incoming synchronization signal from said second interface;
    (b) then transmitting at least a first predetermined number of synchronization signals from said first interface;
    (c) receiving a second incoming synchronization signal from said second interface;
    (d) terminating the transmission of synchronization signals from said first interface after both a second incoming synchronization signal has been received and said first predetermined number of synchronization signals has been transmitted; and
    (e) generating an available signal at regular intervals following the reception of the second incoming synchronization signal.

8. The synchronization method of claim 7 further comprising the step of checking for errors in incoming signals and wherein said step of terminating requires that the second incoming synchronization signal be received without errors.

9. The synchronization method of claim 8 further comprising the step of repeating steps b, c, d and e if three consecutive signals are received each containing an error.

10. The synchronization method of claim 7 further comprising the step of counting synchronization signals as they are received and repeating steps b, c, d and e if the number of synchronization signals received exceeds a second predetermined number, said second predetermined number being larger than said first predetermined number.

11. The synchronization method of claim 7 further comprising the step of transmitting signals over said communication link at regular intervals after terminating the transmission of said synchronizing signals.

12. The synchronization method of claim 11 further comprising the step of repeating steps b, c, d and e if no incoming signals are received after a third predetermined number of signals are transmitted following the termination of the transmission of said synchronizing signals.

* * * * *